(12) United States Patent
Seif et al.

(10) Patent No.: US 11,352,224 B2
(45) Date of Patent: Jun. 7, 2022

(54) PARTS STACKING DEVICE

(71) Applicant: R.K.J. Fabrication & Construction, LLC, Waverly, OH (US)

(72) Inventors: Kelly Seif, Waverly, OH (US); Frederic L. Foill, Waverly, OH (US)

(73) Assignee: R.K.J. FABRICATION & CONSTRUCTION, LLC, Waverly, OH (US)

( * ) Notice: Subject to any disclaimer, the term of this patent is extended or adjusted under 35 U.S.C. 154(b) by 0 days.

(21) Appl. No.: 16/782,325

(22) Filed: Feb. 5, 2020

(65) Prior Publication Data

US 2020/0277148 A1    Sep. 3, 2020

Related U.S. Application Data

(60) Provisional application No. 62/801,190, filed on Feb. 5, 2019.

(51) Int. Cl.
| | |
|---|---|
| *B65G 57/03* | (2006.01) |
| *B65G 57/11* | (2006.01) |
| *B65G 47/24* | (2006.01) |
| *B21D 43/02* | (2006.01) |
| *B65G 61/00* | (2006.01) |
| *B65G 47/82* | (2006.01) |
| *B65G 13/11* | (2006.01) |

(52) U.S. Cl.
CPC .......... *B65G 57/035* (2013.01); *B21D 43/02* (2013.01); *B65G 13/11* (2013.01); *B65G 47/24* (2013.01); *B65G 47/82* (2013.01); *B65G 57/11* (2013.01); *B65G 61/00* (2013.01)

(58) Field of Classification Search
CPC ...... B65G 57/035; B65G 13/11; B65G 47/24; B65G 47/82; B65G 57/11; B65G 61/00; B65G 57/245; B65G 57/00; B65G 57/03; B65G 69/00; B21D 43/02; Y10S 414/12; B65H 31/34; B65H 31/38; B65H 31/36; B65H 31/40
See application file for complete search history.

(56) References Cited

U.S. PATENT DOCUMENTS 1,743,921 A * 1/1930 Kerley ................ B41F 23/0443
271/211
3,182,820 A * 5/1965 Gardner ............... B65H 29/245
414/791.1

(Continued)

FOREIGN PATENT DOCUMENTS

JP    10-71441    * 3/1998 ............... B65H 7/12

*Primary Examiner* — Gregory W Adams
(74) *Attorney, Agent, or Firm* — Fay Sharpe LLP

(57) ABSTRACT

A stacking system for aligning and stacking stamped sheet metal parts is provided. The stacking system includes a frame configured to coordinate a plurality of sub-systems including a parts catcher, receiving head including a plurality of alignment cylinders, and a set of elevating tables on a shuttle platform. Parts are received by the catcher from a conveyor belt and transported to a receiving head for alignment to a targeted position. After the formed part is aligned to the stack, the lift table is lowered such that space is available for another part to be aligned. After a predetermined number of formed parts has been stacked, a table shuttle will slide the lift table to an unloading position accessible by a fork truck.

16 Claims, 16 Drawing Sheets

(56) References Cited

U.S. PATENT DOCUMENTS

| | | | | |
|---|---|---|---|---|
| 3,456,815 A * | 7/1969 | Carrels | B65G 57/11 | |
| | | | 414/793.8 | |
| 3,512,660 A * | 5/1970 | Bende | B21D 43/24 | |
| | | | 271/11 | |
| 3,725,183 A * | 4/1973 | Brookhyser et al. | B27D 1/04 | |
| | | | 156/563 | |
| 3,764,024 A * | 10/1973 | Mojden | B65H 1/22 | |
| | | | 414/788.5 | |
| 3,942,784 A * | 3/1976 | Buccicone | B65H 29/14 | |
| | | | 271/279 | |
| 4,359,218 A * | 11/1982 | Karis | B65H 31/32 | |
| | | | 100/264 | |
| 4,650,390 A * | 3/1987 | Kay | B65G 57/06 | |
| | | | 414/794.2 | |
| 4,765,790 A * | 8/1988 | Besemann | B65H 31/10 | |
| | | | 414/790.4 | |
| 5,039,084 A * | 8/1991 | Messerly | B65H 31/20 | |
| | | | 271/213 | |
| 5,102,117 A * | 4/1992 | Henn | B65H 31/10 | |
| | | | 271/189 | |
| 5,388,954 A * | 2/1995 | Marinoni | B21D 43/24 | |
| | | | 414/795.7 | |
| 5,392,630 A * | 2/1995 | Marinoni | B65G 61/00 | |
| | | | 72/420 | |
| 5,460,480 A * | 10/1995 | Jubre | B21D 43/22 | |
| | | | 414/788.9 | |
| 6,086,063 A * | 7/2000 | Esenther | B65H 29/14 | |
| | | | 271/188 | |
| 6,311,826 B1 * | 11/2001 | Tischler | B21C 51/00 | |
| | | | 198/395 | |
| 6,817,829 B2 * | 11/2004 | Kameda | B65G 61/00 | |
| | | | 414/789.6 | |
| 8,371,796 B2 * | 2/2013 | Runonen | B65H 29/12 | |
| | | | 414/793.3 | |
| 9,045,243 B2 * | 6/2015 | Brown | B65B 11/00 | |
| 2009/0169351 A1 * | 7/2009 | Wu | B65H 31/28 | |
| | | | 414/791.2 | |
| 2011/0099915 A1 * | 5/2011 | Sudkamp | E04H 3/123 | |
| | | | 52/9 | |
| 2013/0209213 A1 * | 8/2013 | Roth | B65G 57/03 | |
| | | | 414/788.9 | |
| 2014/0014886 A1 * | 1/2014 | Ruth sen. | B66F 17/00 | |
| | | | 254/122 | |
| 2016/0145072 A1 * | 5/2016 | Allen, Jr | B65H 31/32 | |
| | | | 271/3.03 | |
| 2018/0071808 A1 * | 3/2018 | Vinuales Duesa | B21D 43/003 | |

* cited by examiner

PARTS STACKING DEVICE

This application which claims the benefit of U.S. Provisional Application Ser. No. 62/801,190, filed Feb. 5, 2019, the entirety of which is hereby expressly incorporated by reference herein.

BACKGROUND OF THE DISCLOSURE

The present disclosure relates to an automated stacking device and finds particular application in conjunction with stacking and transporting stamped automotive metal parts. However, it is to be appreciated that the present exemplary embodiment is also amenable to other like applications.

It is advantageous for material processing equipment to operate continuously in creating formed products. In metal stamping processes, a stamp press, continuously generates formed parts from a coil of sheet metal material. The press stamps the desired part and transfers the formed part out from the equipment for further managing. It is common in the industry for the formed parts to transport on conveyors and eventually end up into the hands of human workers that manually move and stack the formed parts into a pile. The human worker aspect is a significant variable in the efficient processing of formed parts. Any downtime needed by a worker requires the press to stop the continuous forming process. The operation is also dangerous as workers around heavy machinery are required to keep up with the demand of the continuous process.

Thus, an object of the present disclosure is to provide an automated stacking system which allows forming equipment to run continuously and efficiently.

SUMMARY OF THE DISCLOSURE

Various details of the present disclosure are hereinafter summarized to provide a basic understanding of the disclosure. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

Disclosed herein are automated systems for transporting and stacking parts such as automotive parts. The systems each include a frame, a catch, an adjustable receiving head including a plurality of alignment cylinders, at least one lift table, and a table shuttle.

Also disclosed herein are methods for stacking a formed part such as an automotive part. The method includes receiving a formed part by a catcher from a conveyor belt and transporting the formed part to a receiving head. The receiving head, including a plurality of push cylinders adjusted to shape to a perimeter of the formed parts, aligns the formed part into a target pile. After the formed part is aligned to the stack, the lift table is lowered such that space is available for the next formed part coming from the conveyor belt. After a predetermined number of formed parts has been stacked, a table shuttle will slide the lift table to an unloading position accessible by a fork truck.

Still other aspects of the disclosure will become apparent upon reading and understanding of the following detailed description.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF THE DISCLOSURE

Figure 1:
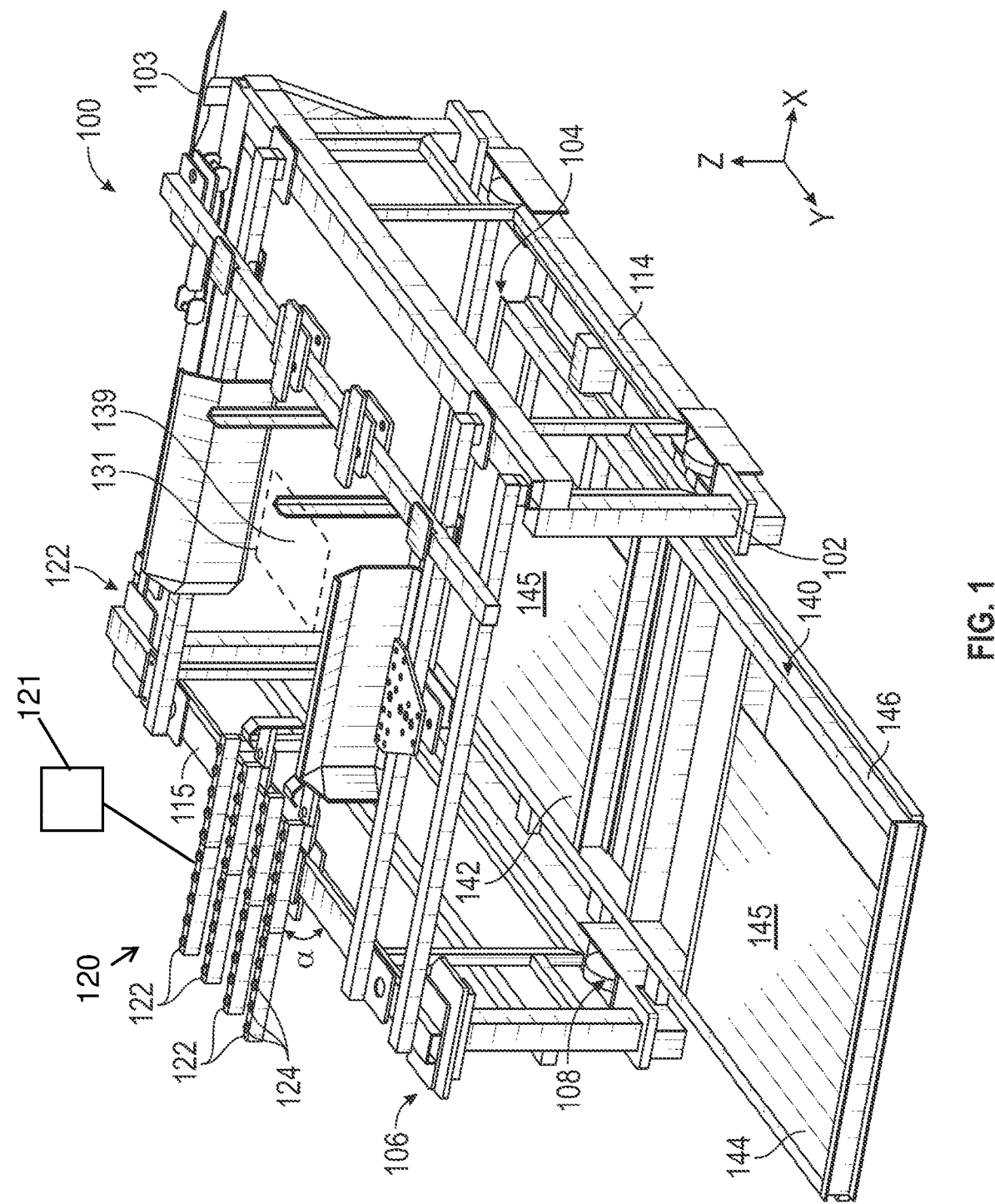
FIG. 1 is a front perspective view of an exemplary stacking system in accordance with the present disclosure.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

The term "mechanical cylinder" is used herein to refer to both hydraulic and pneumatic cylinders.

With reference now to FIGS. 1-9, a stacking system 100 in accordance with a preferred embodiment of the disclosure is arranged on a frame 102. The frame 102 has a front side 104, a conveyor side (also called a rear side) 106, a first loading side 108, a second loading side 110 parallel to side 108, a top 112, and a base 114. Subsystems of the stacking system 100 are configured to be mounted to certain locations on the frame 102.

The stacking system 100 also includes a programmable logic controller (PLC) 101 (FIG. 5) that controls the various subsystems and functions of the stacking system 100. PLCs are known in the art to monitor input signals from a variety of input points (input sensors) which report events and conditions occurring in a controlled process. A control program is stored in a memory within the PLC 101 to instruct the PLC 101 what actions to take upon encountering particular input signals or conditions. In response to these input signals provided by input sensors, the PLC 101 derives and generates output signals which are transmitted via PLC output points to various output devices, such as actuators and relays, to control the process. For example, the PLC 101 issues output signals to speed up or slow down a conveyor, rotate a table position, open or close a relay, raise or lower a table as well as many other possible control functions too numerous to list. The PLC 101 may also be in communication with forming equipment, for example, in cases where the stacking system needs additional time to perform a function the PLC 101 may pause the forming equipment. Thus, the stacking system 100 is fully automated and controlled by a PLC 101. In some embodiments, the PLC 101 is a Q06 PLC available from Mitsubishi. In some embodiments, the PLC 101 may be a PLC integrated into the forming equipment.

In some embodiments, the PLC 101 is configured to communicate with a Human-Machine Interface (HMI) 103. That is, the HMI 103 provides a user interface to the stacking system 101. The HMI 103 may receive commands from a human operator as well as display machine settings and process status to an operator. The HMI 103 may be variously embodied as a touchscreen display, or a display with physical input hardware including keyboards and mice. In some embodiments, the HMI 103 is a GT23 HMI also available from Mitsubishi.

Figure 5:
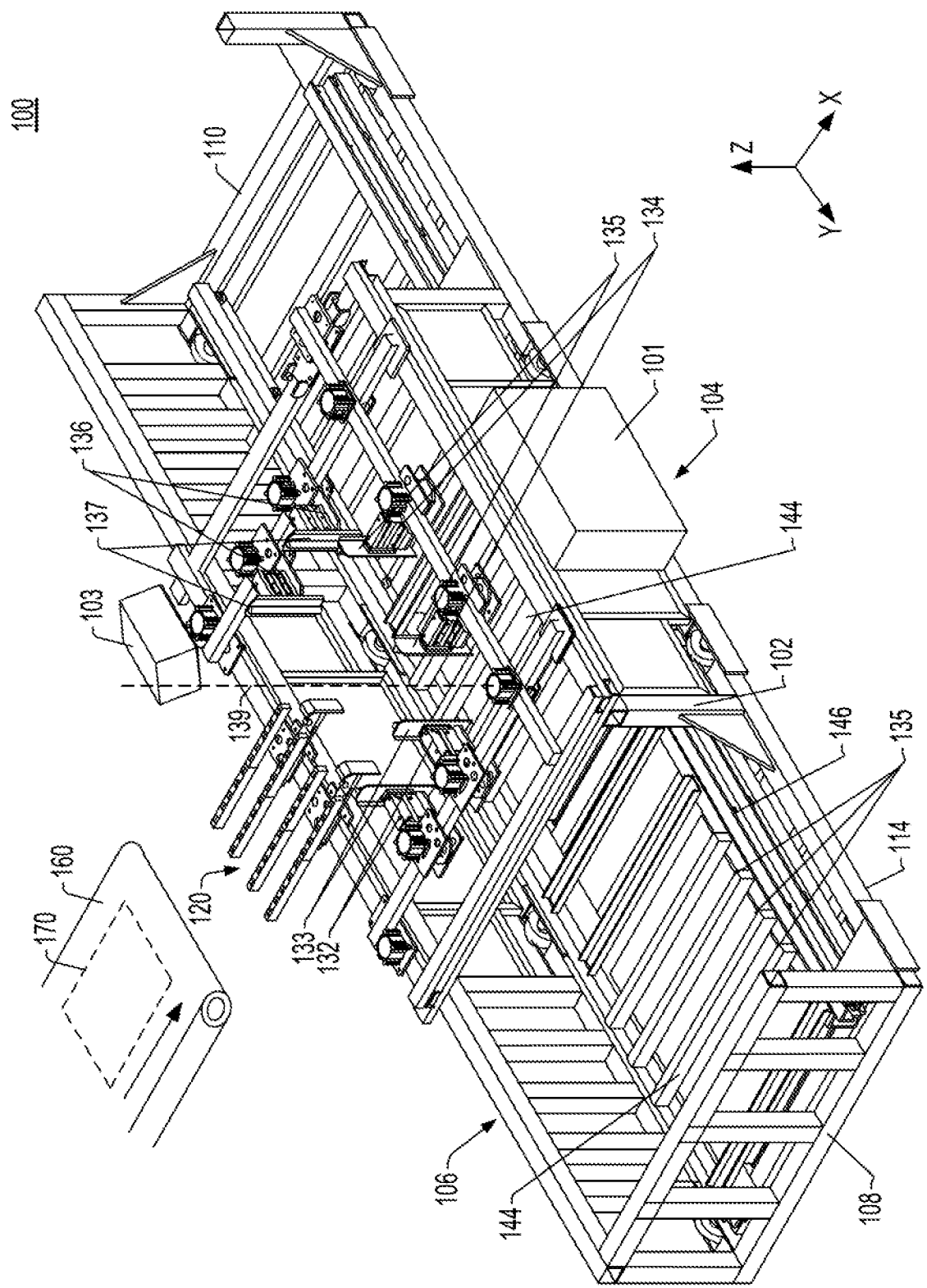
FIG. 5 is a front perspective view of another exemplary stacking system in accordance with another embodiment of the present disclosure.

The stacking system 100 is placed at an end of a conveyor belt, such as conveyor belt 160 transporting formed parts 170 illustrated in FIG. 5. The stacking system 100 is positioned such that the conveyor side 106 is adjacent the end of the conveyor belt 160. With reference back to FIGS. 1-9, a parts catcher 120 is configured to mount to the top 112 conveyor side 106 of the frame 102. Formed parts traveling from the conveyor belt 160 are received by the stacking system 100 via the parts catcher 120, which subsequently transports the formed parts to an alignment plane 131. The part catcher 120 may be mounted to a top 112 frame member, such as frame member 115 by means known in the art, for example and without limitation, the part catcher 120 may attach to frame member 115 by threaded bolts.

Figure 2:
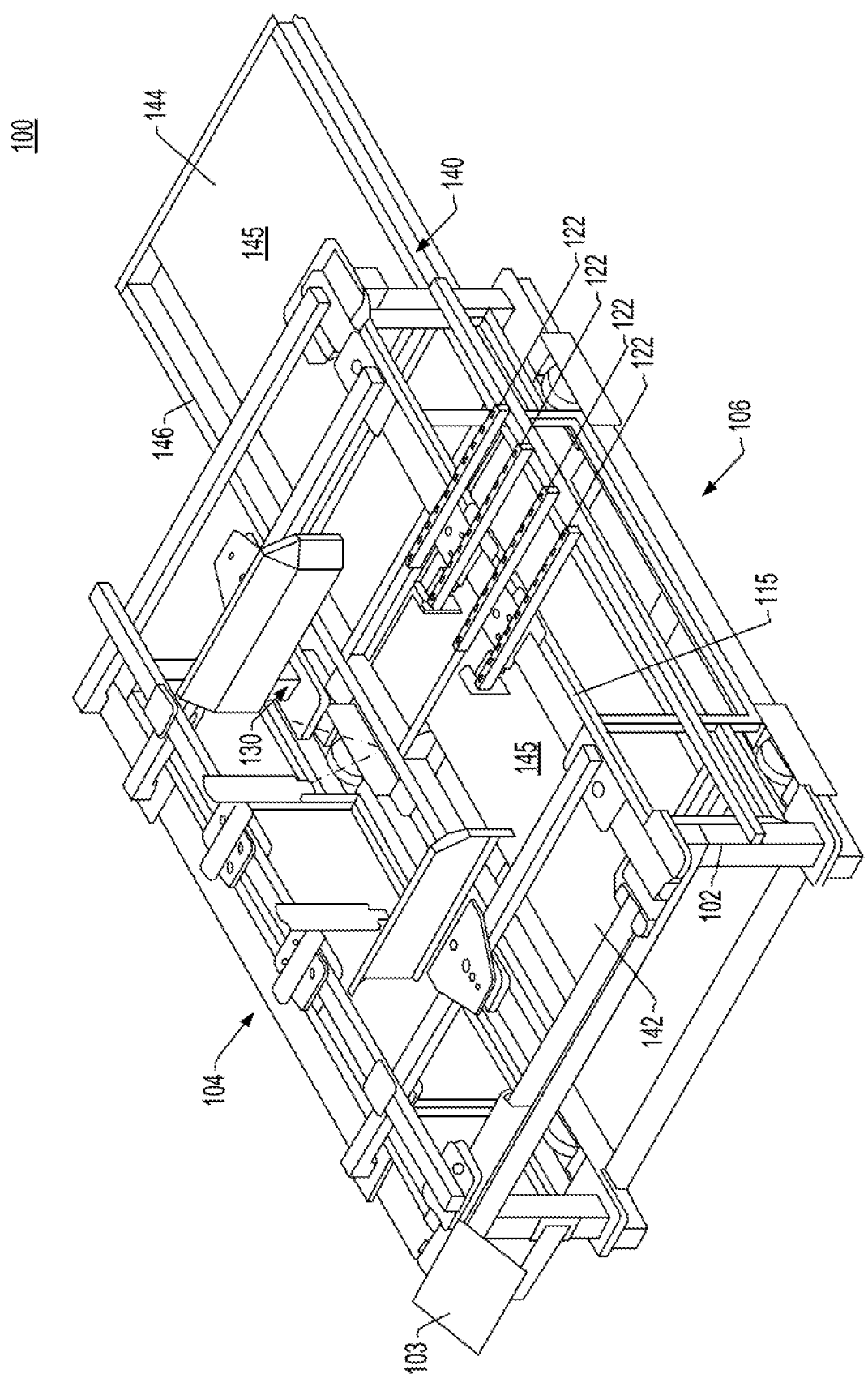
FIG. 2 is a rear perspective view of the stacking system of FIG. 1.

In some embodiments, the part catcher 120 includes a plurality of rails 122 containing rollers 124, also called wheels. A formed part transported by the conveyor belt has an initial velocity while exiting the conveyor belt 160. The parts catcher 120 receives the formed part having the initial velocity and allows the formed part to glide along the rails 122 and rollers 124 to an alignment plane 131 of the receiving head 130 (FIG. 2). In some embodiments, the rails 122 have an elongated body such that the elongated body is parallel to the ground. In other embodiments, the rails 122 are angled with respect to the ground, such that a part slides down the rails 122 with the aid of gravity. In some embodiments, the rails 122 are angled at an angle α with respect to the ground. The angle α may be from about 0 degrees to about 90 degrees. In other embodiments, the rails 122 of a part catcher 120 are adjustable such that any angle α may be selected. The angle α may be dependent on the height of a conveyor adjacent to the conveyor side 106 of the stacking system 100.

Figure 3:
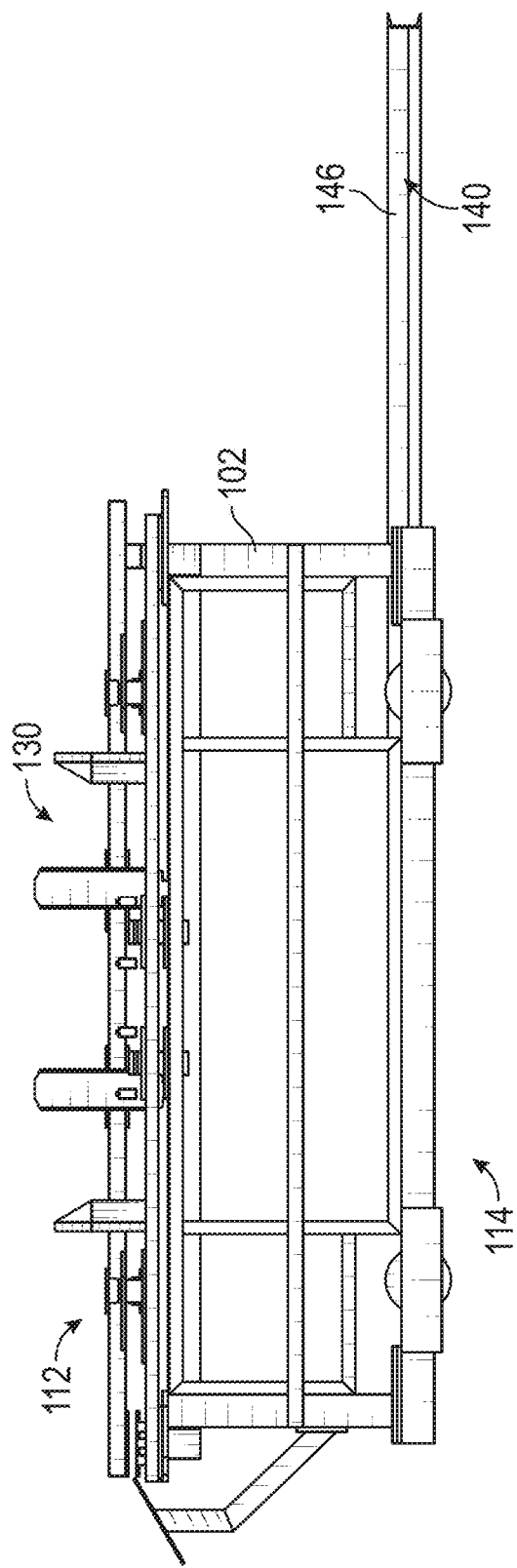
FIG. 3 is a side elevational view of the stacking system of FIG. 1.
Figure 4:
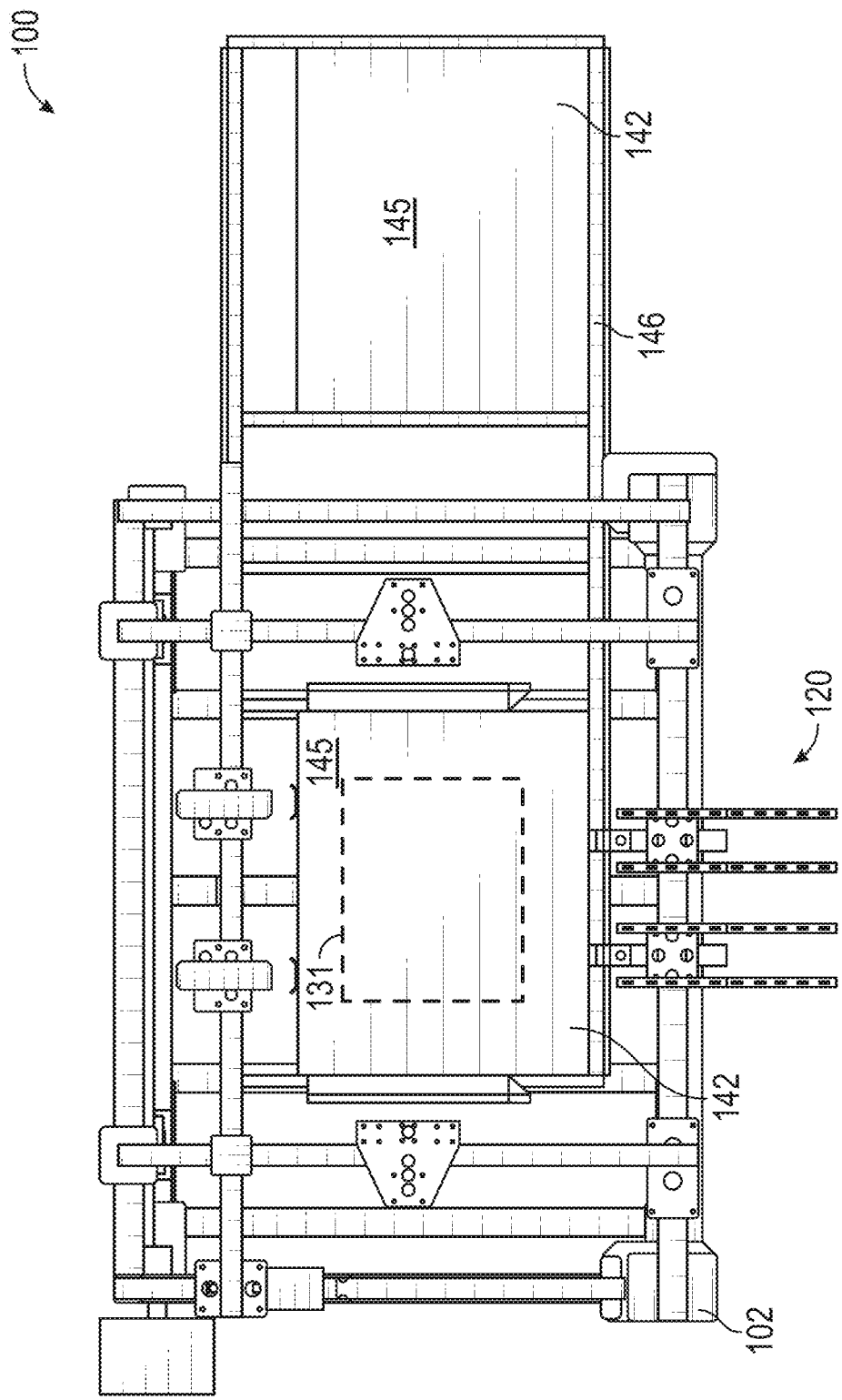
FIG. 4 is a top plan view of the stacking system of FIG. 1.

It is to be appreciated that the part catcher 120 may be a passive or active system. Specifically, herein a passive system refers to a part catcher 120 that is not powered by a motor. Rather, formed parts are transported along the part catcher 120 to the alignment plane by leveraging the initial velocity of a formed part exiting a conveyor belt, utilizing the force of gravity, or both. The part catcher 120 may also be an active system utilizing power and/or motors 121 to receive and transport a formed part to the receiving head 130. In some embodiments, the part catcher 120 includes a stacking system conveyor belt driven by motors to receive a formed part and transport it to a receiving head 130 (FIG. 3). In other embodiments, the rails 122 and rollers 124 include motors such that the rollers 124 rotate in a direction to advance a formed part to the receiving head 130.

The stacking system 100 also includes receiving head 130 mounted to the top 112 of the frame 102. The operation of the receiving head 130 is controlled by the PLC 101. The receiving head 130 is configured to receive formed parts within an alignment plane 131 that are incoming from the part catcher 120. The receiving head 130 may be completely adjustable to the shape of any formed part. A table system 140 (FIG. 2), described in greater detail below, interacts with the receiving head 130 in receiving and stacking the formed parts. That is, a formed part transitions from the part catcher 120 to a raised table 142, 144 of the table system 140 wherein the formed part within the alignment plane 131 is urged by components (mechanical cylinders) of the receiving head 130 to align the formed part to a desired position. It is to be appreciated that while illustrated and discussed herein as exemplary x-y plane, the alignment plane 131 may be any desired plane including but not limited to the x-z plane, y-z plane and intermediate and/or angled planes in between.

Figure 6:
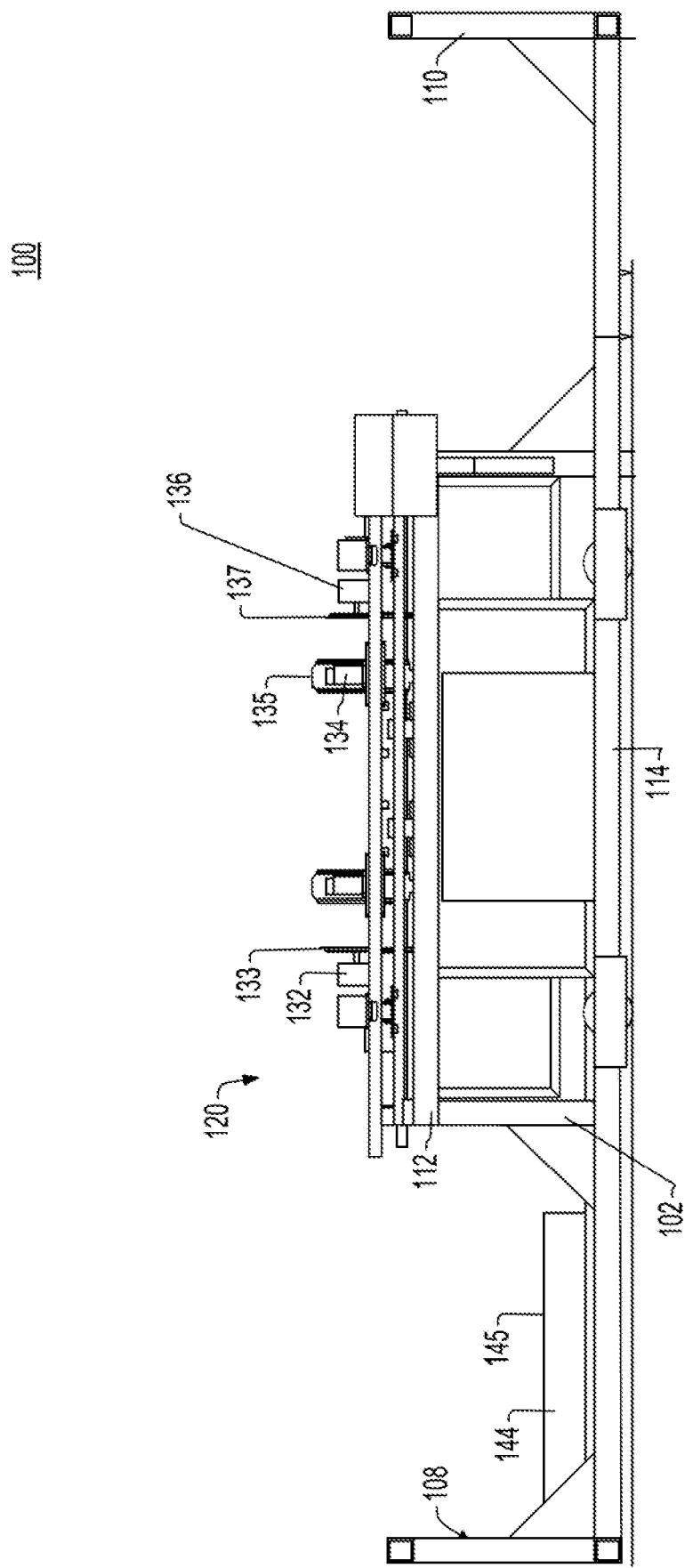
FIG. 6 is a front elevational view of the stacking system of FIG. 5.
Figure 7:
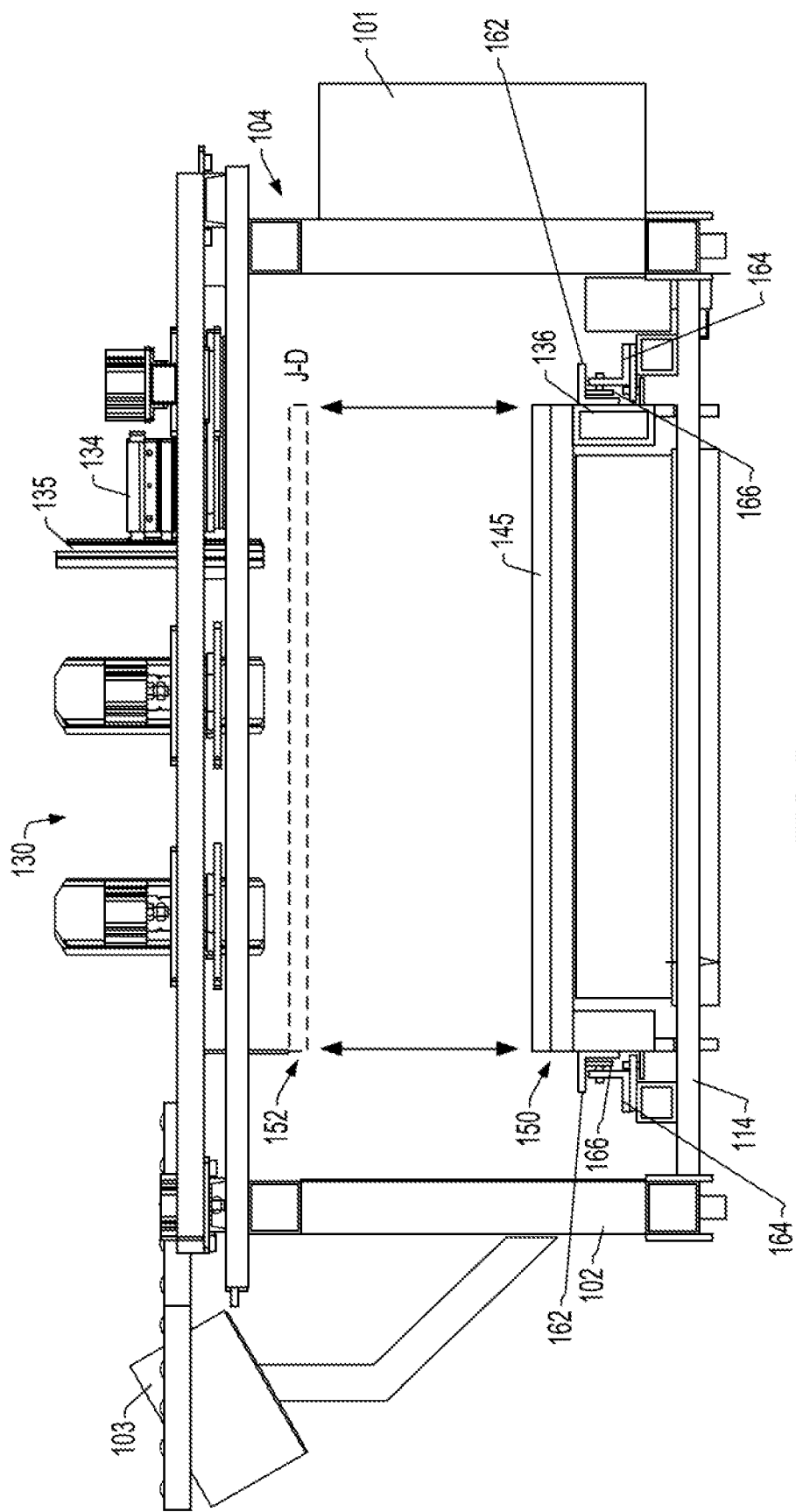
FIG. 7 is a side elevational view of the stacking system of FIG. 5.
Figure 8:
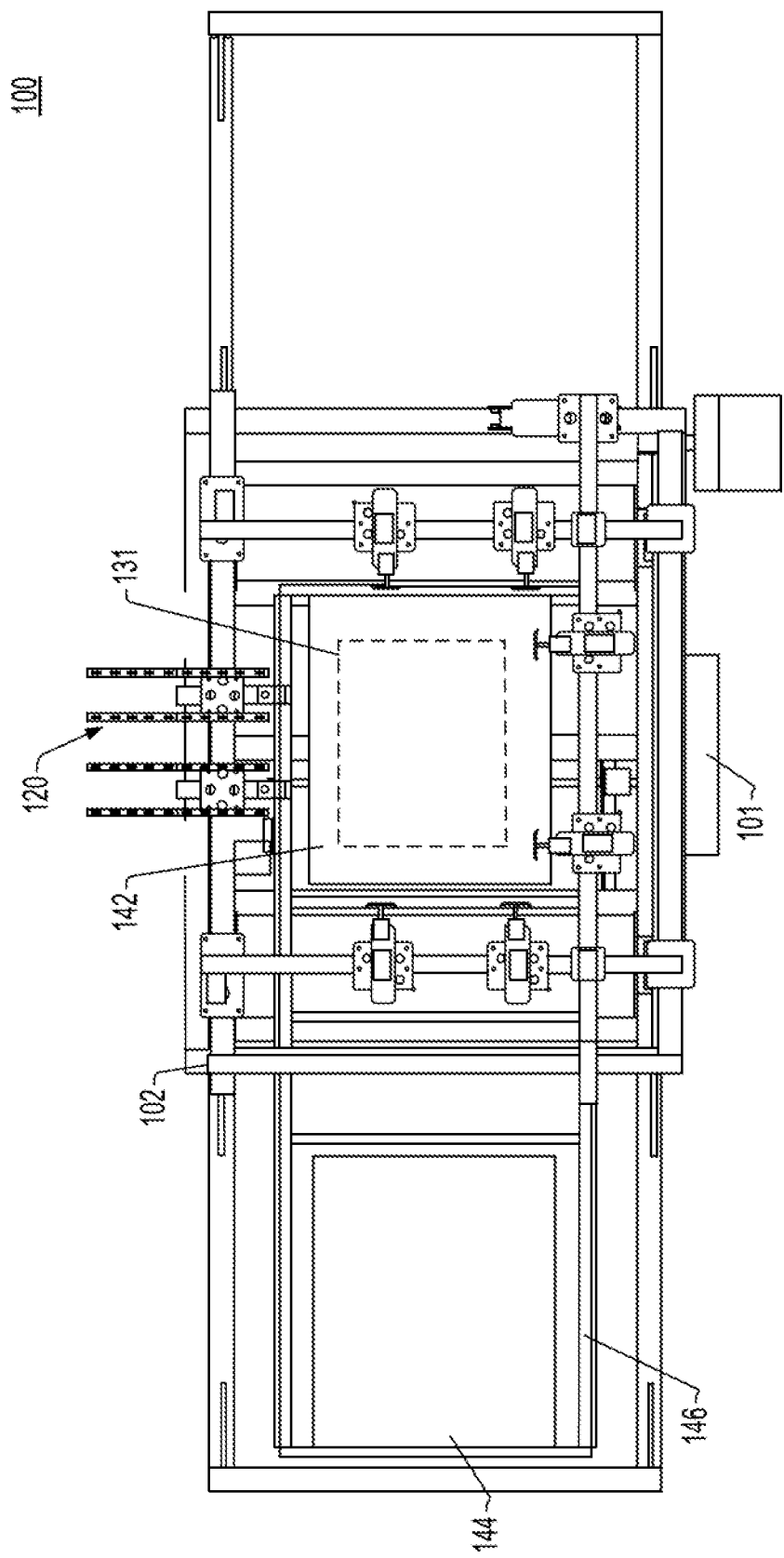
FIG. 8 is a top plan view of the stacking system of FIG. 5.
Figure 9:
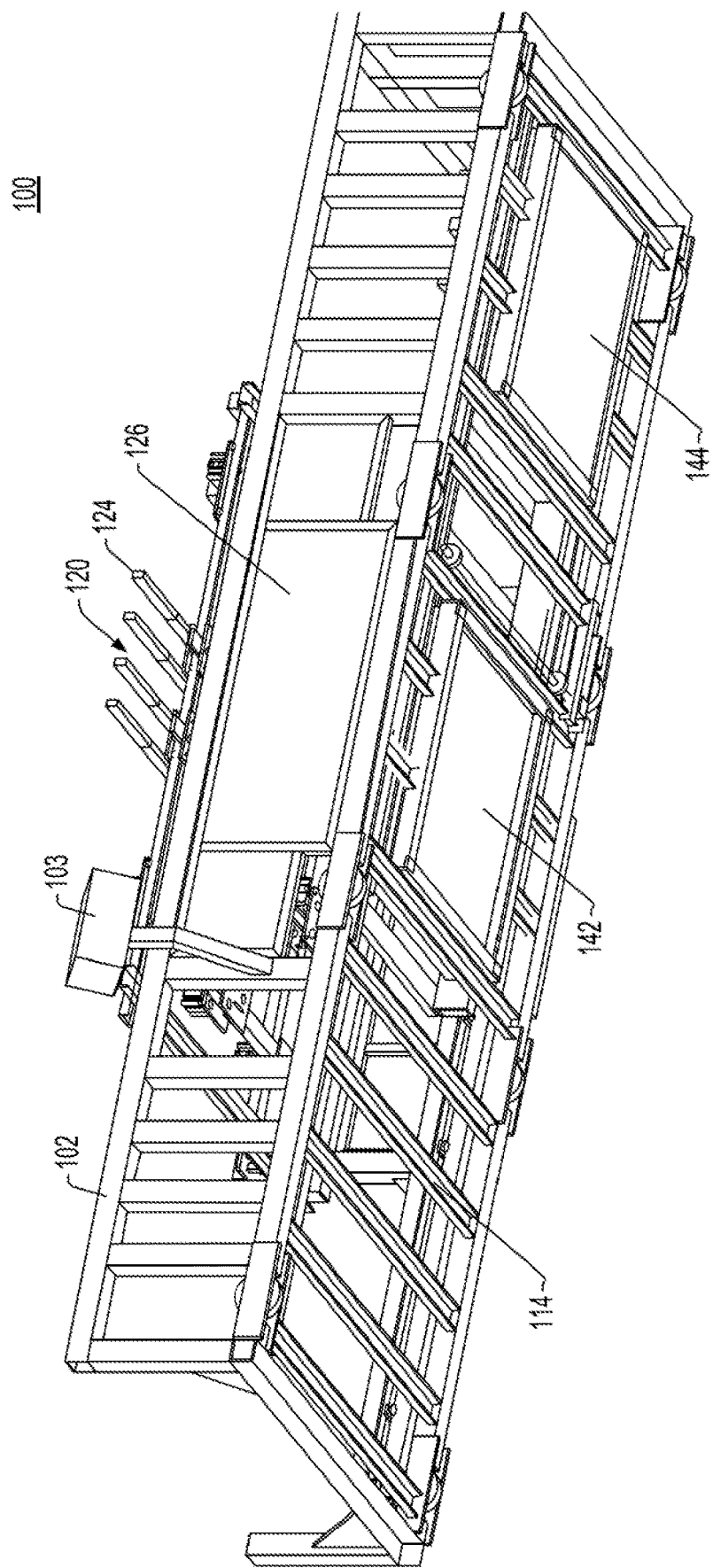
FIG. 9 is a bottom perspective view of the stacking system of FIG. 5.

With reference to FIGS. 5-7, the receiving head 130 includes a plurality of extendable components such as mechanical cylinders 132, 134, and 136 each having a shaped component head (cylinder head) 133, 135, and 137 respectively. The shape of a shaped-cylinder head is generally selected based upon on the shape of the formed part. That is, the shape of the cylinder head is configured to match at least a portion of a perimeter of the formed part. It is to be appreciated that each shaped cylinder head may be of a different shape to accommodate the design of a formed part. The shaped cylinder heads 133, 135, and 137 generally face toward a center 139 of the alignment plane 131. That is, when the extendable components 132, 134, and 136 are actuated, the shaped cylinder heads 133, 135, 137 are extended in a direction toward the center 139. The receiving head 130 may include at least extendable component 132 positioned between the center 139 and first loading side 108 and at least one extendable component 136 positioned between the center 139 and second loading side 110. When a formed part travels to the alignment plane 131, the extendable components 132 and 136 actuate, such that the cylinder heads 133 and 137, respectively, contact the incoming formed part from generally opposing sides, and urge the formed part to a desired x-y position within the alignment plane 131. The receiving head 130 also includes at least extendable component 134 positioned between the center 139 and front side 104. The extendable component 134 is configured to actuate and stop an incoming formed part (from the parts catcher 120) to the desired x-y position. Together extendable components 132, 134, and 136, urge/position an incoming formed part to a target location within the alignment plane 131. The extendable components may be, for example and without limitation, mechanical cylinders having an extendable shaft connected to a shaped cylinder head.

The tables of the table system 140 are configured to raise and lower along the z-direction. Specifically, the tables 142 and 144 are configured to lower after a formed part is aligned by the receiving head 130. The receiving head 130 aligns an incoming formed part within the alignment plane 131, after which a table, such as table 142 of the table system 140 is lowered allowing another formed part incoming from part catcher 120 to enter the alignment plane 131 unimpeded. That is, the table 142 lowers to create space within the alignment plane 131 for a formed part to enter. This allows the formed parts to be subsequently stacked in the z-direction, as the table 142,144 lowers each time a formed part is aligned.

With reference back to FIGS. 1-9, the stacking system 100 also includes a table system 140 mounted to the base 114 of the frame 102. The operation of the table system 140 is controlled by the PLC 101. The table system 140 includes a first table 142 and second table 144 where each table 142, 144 is mounted to opposite ends of a shuttle 146. The shuttle 146 includes a shuttle frame providing a foundation for mounting the tables 142 and 144.

The shuttle 146 is configured to shift and/or slide from a first position to a second position and vice versa. In the first position, the first table 142 is positioned in the center 139 of the receiving head 130. In the second position, the second table 144 is position about the center 139 of the receiving head 130. In some embodiments, the movement to and from the first and second positions is facilitated by a drive shaft 154, chain 155 and motor 156 (illustrated in FIG. 13) controlled by the PLC 101. It is to be appreciated that other means for facilitating movement of the shuttle to a plurality of positions may be substituted therein including but not limited to a belt and pulley system, electronic system including solenoids and/or magnetics, hydraulic means, and linear rails.

In some embodiments and with reference to FIG. 7 the shuttle includes a set of elongated top rails 162. The elongated top rails 162 are positioned along the direction of movement. For example, if the shuttle 146 is configured to move east to west and vice versa, the elongated rails are also positioned in an east-west direction. The base 114 includes a set of bottom rails 164 each with a plurality of cam follower bearings 166 configured to provide a low friction surface rolling surface for supporting the top rails 162. That is, the top rails 162 rest and slide via the rolling action provided by the cam follower bearings 166. In other embodiments, the shuttle system employs a set of tracks and casters to facilitate movement of the shuttle 146. While rail and track systems are disclosed herein, it is to be appreciated that any system that facilitates the smooth movement of the shuttle 146, in any direction or plurality of directions (including linear and planer movements). In some embodiments, the shuttle 146, includes or rests on a set of rollers or casters to ensure smooth movement between positions.

With particular reference to FIGS. 7 and 13-16, the tables 142 and 144 are tables with adjustable heights. That is, the tables 142 and 144 are configured to elevate from a home position 150 (FIG. 7), the lowest height position (illustrated in FIGS. 7 and 16), to raised position 152 (FIG. 7), the maximum height position (illustrated in FIGS. 13-15) and vice versa as well as maintain any height position therebetween. The tables 142 and 144 may be lift tables employing a scissor mechanism 149 (FIG. 13) for raising and lowering a table surface 145. The scissor mechanism uses linked, folding supports in a crisscross "X" pattern. Elevation of the table surface 145 is achieved by applying pressure to one set of supports and elongating the crossing pattern. This may be achieved through hydraulic, pneumatic, or mechanical means, including extendable cylinders 148.

During stacking of formed parts, the shuttle 146 begins in a first position with the first table 142 is positioned in the center 139 of the alignment plane 131 of the receiving head 130. The first table 142 is elevated to the raised position 152. Each time a formed part is received and aligned by the receiving head 130, the PLC 101 controlling the table system 140 sends a signal to the table system 140 that lower the first table by displacement D. The displacement D is about equal to a thickness of a formed part, such that when a new incoming formed part is received by the receiving head 130, the incoming formed part rests on the table surface 145 or on the previously aligned part, but always in the same alignment plane at a predetermined height along the z-axis. The lowering of the first table 142 in increments of displacement D continues until a lower height threshold is met. In some embodiments, the lower height threshold is the home position 152.

When a preprogrammed number of formed parts are stacked onto the first table 142 a signal is sent from the stacking system 100 to the associated forming equipment instructing the forming equipment to pause or turn off. With the forming equipment paused, the PLC 101, instructs the table system 140 to shift the shuttle 146 from its first position to the second position. The first table 142, is then in position within the first loading side 108 to which the stacked of formed parts is accessible by a fork truck. In some embodiments, the stack of formed parts is accessible by forks approaching from the front 104 of the stacking system 100. In other embodiments, the stack of formed parts is accessible from approaching the first loading side 108 of the stacking system 100. In some embodiments, the stack of formed parts is accessible by a fork approaching the conveyor side 106 of the stacking system 100. In yet still other embodiments, the stack of formed parts is accessible by a fork approaching from one of the aforementioned approaches.

In some embodiments, a table, such as table 142 or 144, includes a top surface 145 that may rotate. In this way, a table with a stack of formed parts may rotate with the table surface 145 such that the stack of formed parts are easily accessible by a fork truck. The table surface 145 may be capable of a 90 degree, 180 degree, 360 degree, or any degree of rotation therebetween. In some embodiments, the table, such as table 142 or 144, includes a lock that prevents the table surface 145 from rotating. The lock may be a manual lock, requiring an operator to remove the lock allowing table rotation, or the lock may be controlled by the PLC 101 such that an operator may operate the lock via the HMI 103.

When the shuttle 146 transfers from its first position to the second position, the second table 144 is positioned in the center 139 of the receiving head 130. The table 144 may be elevated to a raised position 152. At this point, the stacking system 100 may send a signal to the forming equipment to resume processing. The second table 144 is then configured to receive formed parts in the same way performed by the first table 142. In this way, a first stack of formed parts may be removed from the first table 142 while the second table 144 begins acquiring its stack of formed parts. When the first stack of formed parts is removed from the first table 142 and the second table 144 acquires a preprogrammed number of formed parts, the shuttle 146 moves from its second position back to its first position. At this point, parts stacked on the second table, are accessible by a fork truck at the second loading end 110. It is to be appreciated that the stacking system 100, is able to run continuously such that the associated forming equipment experiences as little stop time (downtime) as possible.

In some embodiments, the table surface 145 includes a plurality of grooves 157. The grooves 157 are of a height and width that receive a set of forks of a fork truck without contacting the stack of formed parts, resting on the table surface 145. That is, the forks may enter the grooves 157 and in a position below the stack of formed parts. An operator of the fork truck may then raise the forks above the grooves 157 initiating contact with and supporting the stack of form parts for removal from the table.

Figure 10:
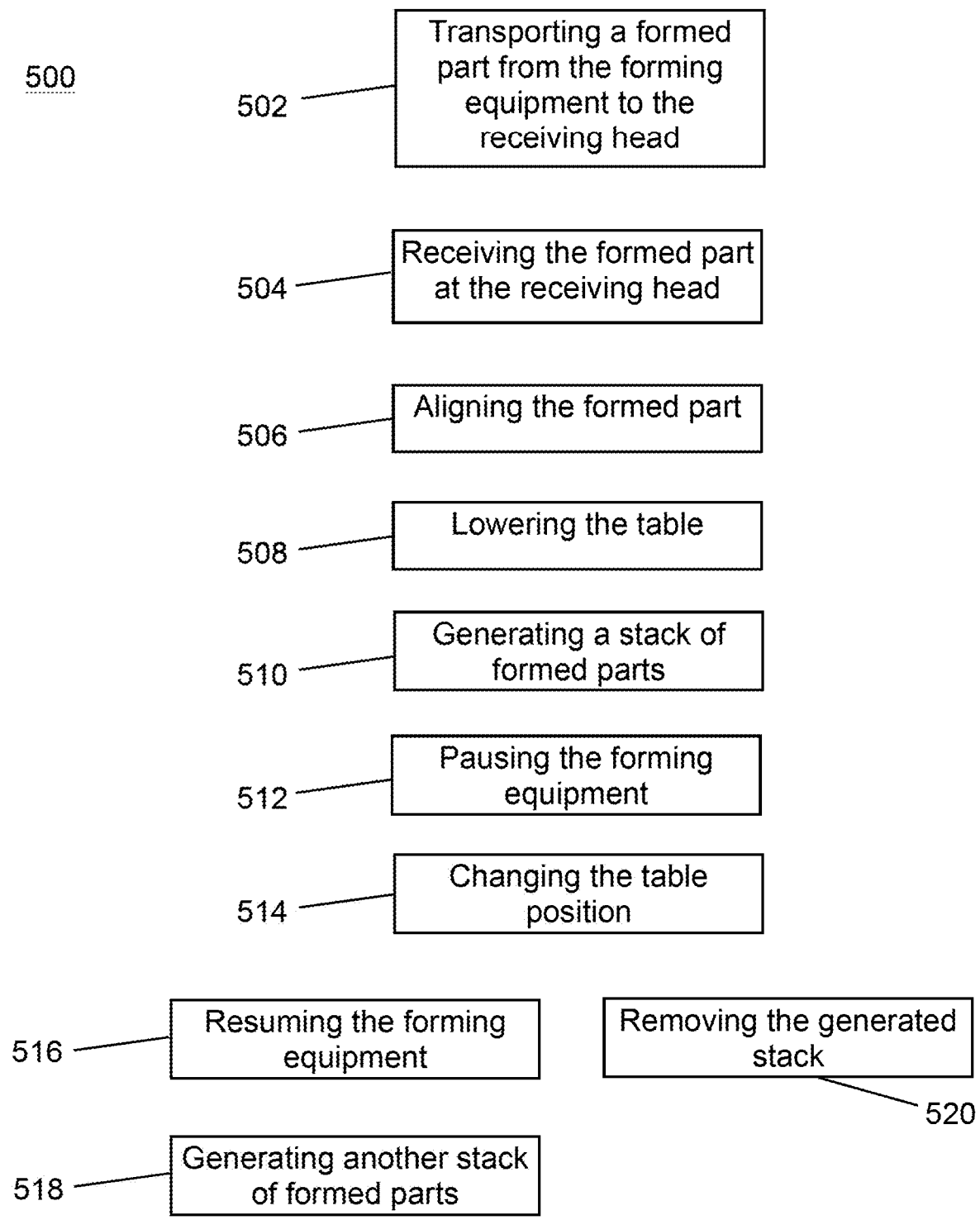
FIG. 10 is a block diagram of a stacking process performed by a stacking system in accordance with another embodiment of the present disclosure.

Referring to FIG. 10 a chart of a parts stacking process 500 as performed by a parts stacker, such as stacking system 100 is shown. The parts stacking process 500 includes at step 502, transporting a formed part from the forming equipment to a receiving head 130 of a stacking system 100. Generally, forming equipment, such as a metal stamping press, is associated with a conveyor belt 160 that removes formed parts from the forming equipment. A stacking system, 100 is placed at the end of an associated conveyor belt, or other parts transporting mechanism, such that a parts catcher 120, is able to receive a formed part from the forming equipment. The formed part is transported by the parts catcher 120 to an alignment plane of a receiving head 130.

At step 504, the receiving head 130 receives a formed part within an alignment plane 131. The alignment plane is an x-y plane at a predetermined z-height. In some instances, the alignment plane 131 is entered when a received formed part lands on a table surface 145 of a first table 142 in a table system 140. In other instances, the alignment plane 131 is entered when a received formed part lands on a previously aligned part (in the generation of a stack).

At step 506, the receiving head 130 aligns the received formed part. Here, a plurality of mechanical cylinders positioned around a substantial portion of the alignment plane 131 and equipped with shaped cylinder heads, actuate such that cylinder heads urge a received formed part to a desired x-y position.

At step 508, after the formed part is aligned to a desired x-y position at 506, the first table 142 of the table system 140 lowers by a displacement D providing space in the alignment plane for a new formed part to be received. A stack of formed parts is generated at step 510, by the repetition of steps 502-508 until a predetermined number of formed parts is aligned and stacked.

Once a preprogrammed number of formed parts have been stacked, the stacking system 100, at step 512, sends a signal to the forming equipment instructing the forming equipment to cease forming parts. When the forming equipment is paused, the table system 140, at step 514, shifts to a second position such that the first table 142 supporting the generated stack of formed parts is in an unloading position and a second table 144 is positioned in the center 139 of the receiving head 130. The second table 144 is elevated to a raised position such that a new stack may be generated with a part able to be supported by the table 144 in the alignment plane.

One the second table 144 is elevated, the stacking system 100, at step 516, sends a signal to the forming equipment instructing the forming equipment to resume forming parts. Another stack of formed parts is generated at step 518, by repeating steps 502-510 but with respect to the second table 144. Once another stack of formed parts is created, the forming equipment is then paused at step 512 and the position of the table system is changed at 514. However, it is to be appreciated that when a stack of formed parts is generated on the second table 144, the table system 140 shifts such that the second table 144 moves to an unloading position and the first table 142 is again positioned under the receiving head 130 to being receiving formed parts.

While one table, either table 142 or 144, is receiving parts from the receiving head 130, the other table 144 or 142, respectively, is in position for unloading. That is, a stack of formed parts may be removed at step 520 while another stack of formed parts is being generated.

The present disclosure is further illustrated in the following non-limiting working examples, it is being understood that these examples are intended to be illustrative only and that the disclosure is not intended to be limited to the materials, conditions, process parameters and the like recited herein.

EXAMPLES

Figure 11:
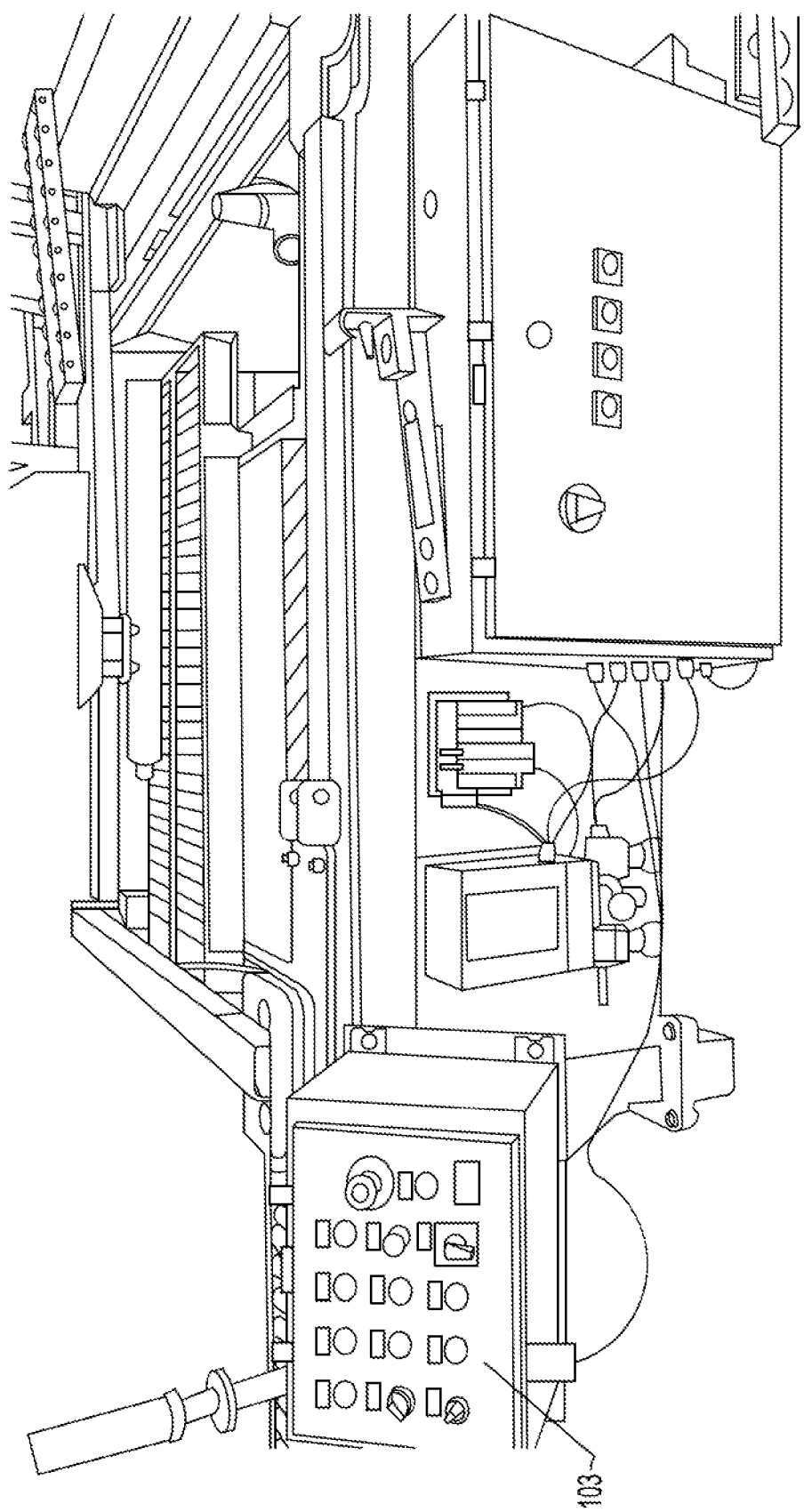
FIG. 11 illustrates an example programmable logic controller and human-machine interface of a stacking system in accordance with an embodiment of the present disclosure.

FIG. 11 illustrates an exemplary stacking system and in particular, a stacking system having a human-machine interface 103. As shown, the human-machine interface includes a plurality of control manipulee by a human operator to operate the exemplary stacking system.

Figure 12:
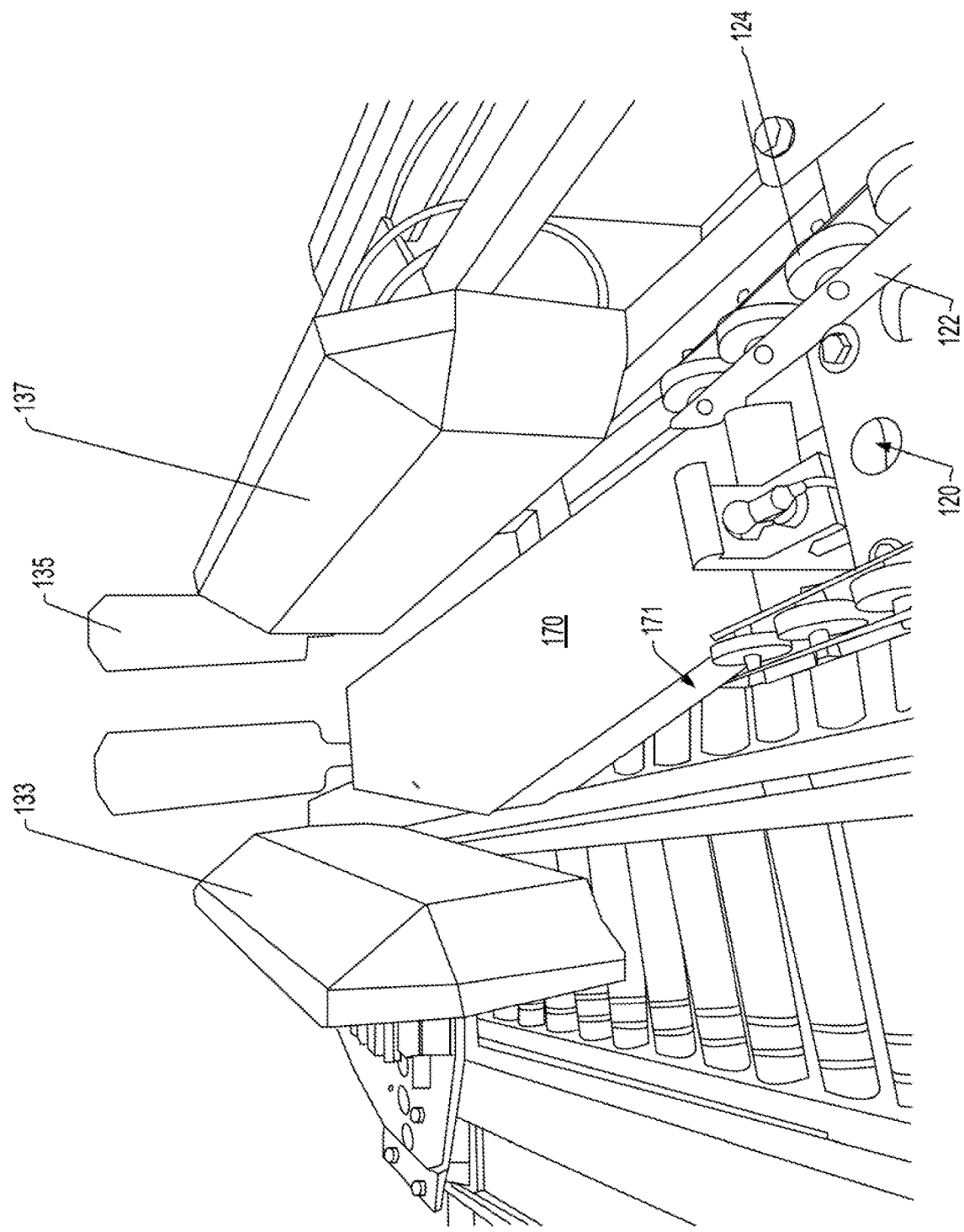
FIG. 12 illustrates an example of a receiving head stacking a five-sided formed part in accordance with an embodiment of the present disclosure.

FIG. 12 illustrates an exemplary stacking head having shaped cylinder heads 133 and 137 attached to mechanical cylinders (not shown). The shaped cylinder heads 133 and 137 were configured to match a side of a formed part 170. The formed part 170 is shown as an elongated five-sided sheet of sheet metal. The formed part 170, was transported from a conveyor associated with the forming equipment to the alignment plane via the part catcher 120. When a formed part 170 entered the alignment plane, the cylinders extended and urged the formed part 170 (by forced contact between the part and cylinder heads 133, 135, and 137) and into a position within the stack 171.

Figure 13:
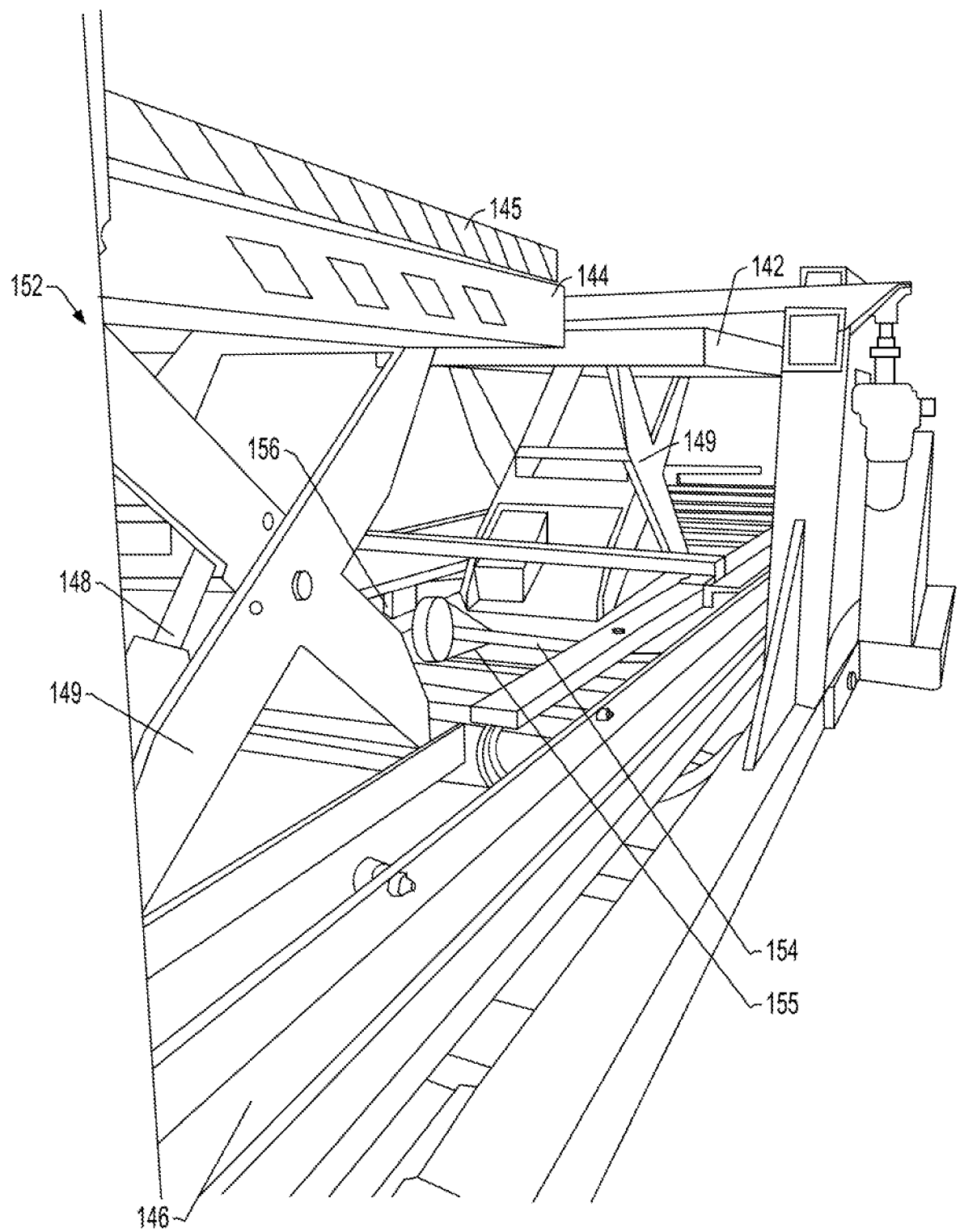
FIG. 13 illustrates an example of a table system in accordance with an embodiment of the present disclosure.
Figure 14:
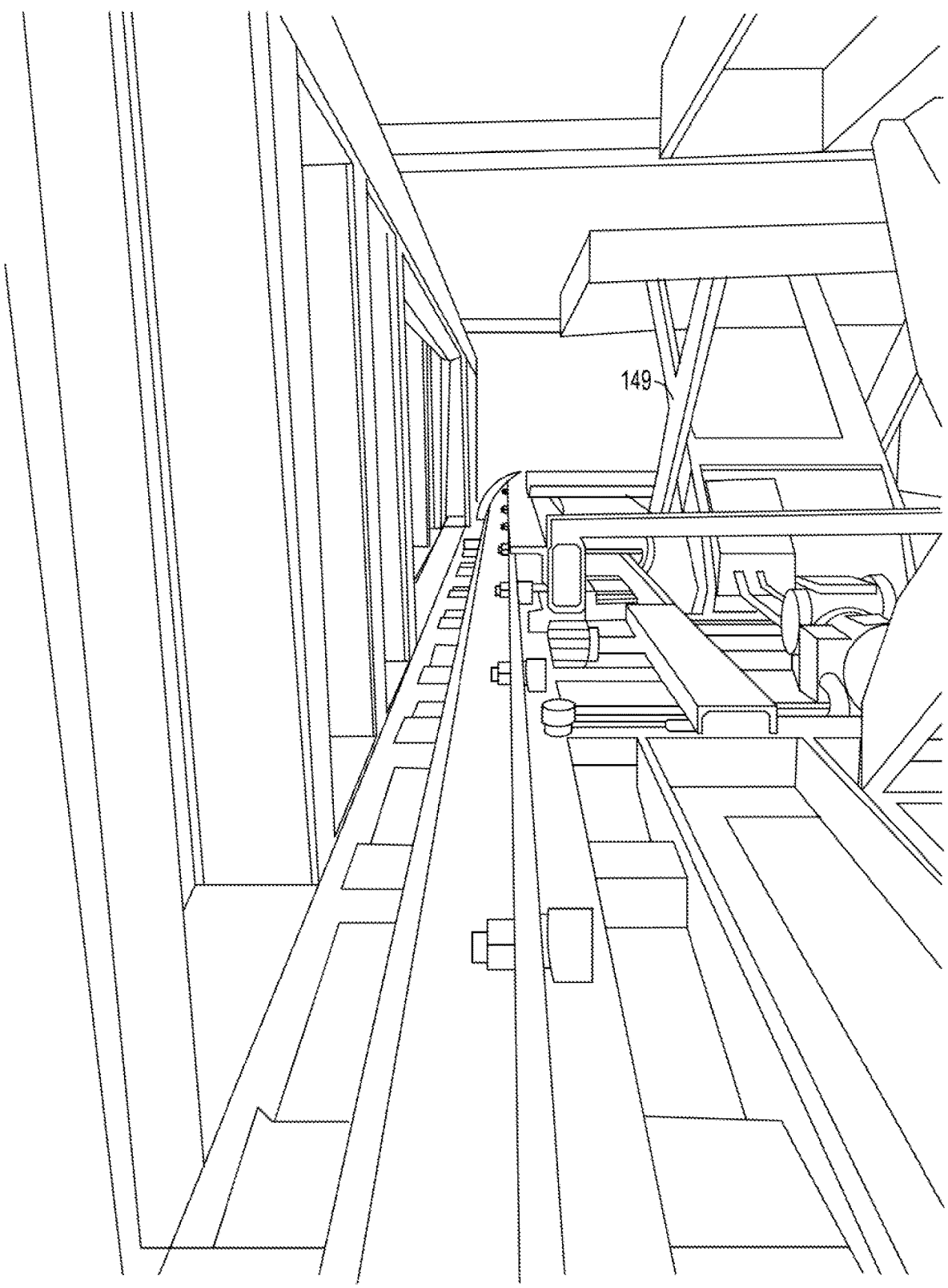
FIG. 14 further illustrates the example of FIG. 13.
Figure 15:
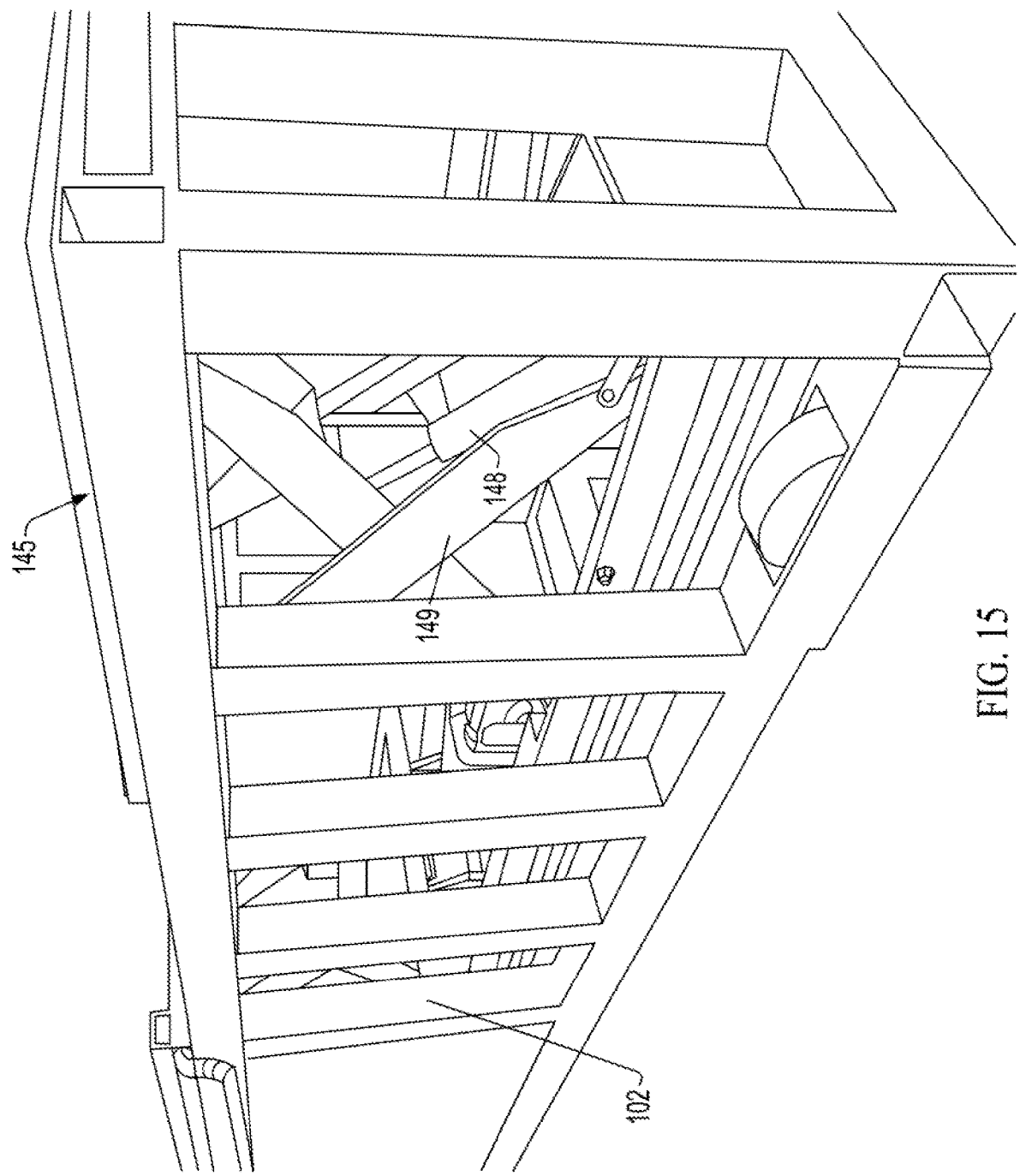
FIG. 15 illustrates a perspective view an example stacking system in accordance with an embodiment of the present disclosure.
Figure 16:
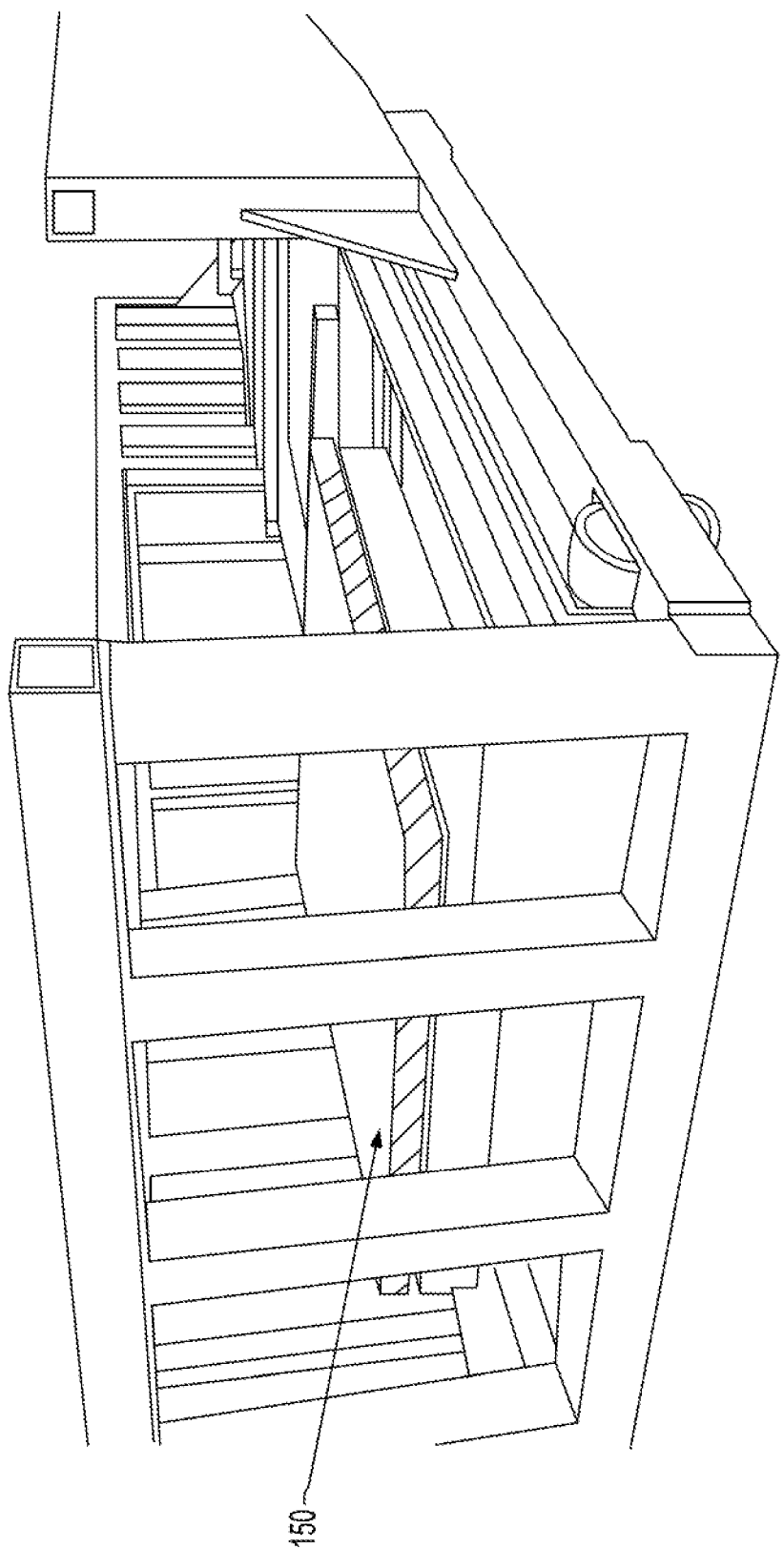
FIG. 16 illustrates a perspective view of an unloading portion of a stacking system in accordance with an embodiment of the present disclosure.

FIGS. 13-16 illustrate an exemplary table system 140 as part of a stacking system. FIG. 13-15 show both tables 142 and 144 in the raised position 152. The raised position 152 was accomplished by extending mechanical cylinders 148 such that the crisscross support members 149 generated an elongated x pattern. FIG. 16 shows the tables in a home or lower position 150.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

The invention claimed is:

1. A device for stacking parts comprising:
a frame;
a plurality of rails, each rail comprising a plurality of rollers, for transporting parts to an alignment plane within the frame, wherein the plurality of rails is attached to a top surface of a top frame member of the frame;
an adjustable receiving head attached to the frame for aligning parts;
a first adjustable lift table positionable at a plurality of elevations beneath the receiving head; and
a programmable logic controller (PLC) which controls operation of the receiving head and controls raising and lowering the first adjustable lift table, wherein the PLC is in communication with a parts forming equipment and configured to control adjusting a speed of a conveyor between the device and the parts forming equipment and to control pausing the parts forming equipment when the device requires additional time to perform a function.

2. The device of claim 1, wherein the receiving head comprises a plurality of extendable components facing toward an internal area of the alignment plane.

3. The device of claim 2, wherein the extendable components are mechanical cylinders, each mechanical cylinder having a shaped component head.

4. The device of claim 2, wherein the plurality of extendable components comprises three extendable components distributed around the internal area of the alignment plane.

5. The device of claim 1, further comprising:
a second adjustable lift table positionable at a plurality of elevations beneath the receiving head; and
a table shuttle for alternative which of the first adjustable lift table and the second adjustable lift table is located beneath the receiving head.

6. The device of claim 1, wherein the first adjustable lift table comprises at least one upper surface recess.

7. The device of claim 1, further comprising:
a human-machine interface (HMI).

8. The device of claim 7, wherein the HMI comprises a touchscreen.

9. A device for stacking parts comprising:
a frame;
a parts catcher for transporting parts to an alignment plane within the frame, wherein the parts catcher is attached to the frame;
an adjustable receiving head attached to the frame for aligning parts;
a first adjustable lift table;
a second adjustable lift table;
a table shuttle configured to transport the first adjustable lift table and the second adjustable lift table between a parts loading position located beneath the adjustable receiving head and a parts unloading position not located beneath the adjustable receiving head, wherein the table shuttle comprises a set of elongated top rails positioned along a direction of movement and a base comprising a set of bottom rails wherein each bottom rail is associated with a plurality of cam follower bearings configured to provide a low friction surface rolling surface for supporting the top rails; and
a programmable logic controller (PLC) which controls operation of the receiving head and the table shuttle.

10. The device of claim 9, wherein the first adjustable lift table and the second adjustable lift table are positionable at a plurality of elevations along z-axis; and wherein the adjustable receiving head is configured to align parts in an x-y plane.

11. The device of claim 9, wherein the receiving head comprises a plurality of extendable components facing toward an internal area of the alignment plane.

12. The device of claim 9, wherein movement of the table shuttle is facilitated by a drive shaft, a chain, and a motor controlled by the PLC.

13. The device of claim 9, wherein the PLC is in communication with parts forming equipment and configured to control pausing the forming equipment when the device requires additional time to perform a function.

14. The device of claim 13, wherein the PLC is configured to control shifting the first adjustable lift table from the parts loading position to the parts unloading position when the forming equipment is paused; and wherein movement of the table shuttle is facilitated by a drive shaft, a chain, and a motor controlled by the PLC.

15. A process for stacking parts comprising:
providing a part to a parts catcher of a stacking device, the stacking device comprising:
a frame;
the parts catcher for transporting parts to an alignment plane within the frame, wherein the parts catcher is attached to the frame;
an adjustable receiving head attached to the frame for aligning parts;
a first adjustable lift table positionable at a plurality of elevations beneath the receiving head; and
a programmable logic controller (PLC) which controls operation of the receiving head and controls raising and lowering the first adjustable lift table, wherein the PLC is in communication with a parts forming equipment and configured to control adjusting a speed of a conveyor between the device and the parts forming equipment and to control pausing the parts forming equipment when the device requires additional time to perform a function;
transporting the part to the alignment plane;
aligning the part with the adjustable receiving head; and
contacting the part with the first adjustable lift table.

16. The process of claim 15, wherein the process further comprises:
repeating the providing, transporting, aligning, and contacting elements to stack a plurality of parts;
wherein the first adjustable lift table is lowered prior to each contacting element to permit each successive part to be stacked.

* * * * *